(12) United States Patent
Berjot et al.

(10) Patent No.: US 12,539,974 B2
(45) Date of Patent: *Feb. 3, 2026

(54) FRONT ENGINE ATTACHMENT SYSTEM FOR AN AIRCRAFT ENGINE, WHICH HAS A COMPACT STRUCTURE

(71) Applicant: Airbus Operations SAS, Toulouse (FR)

(72) Inventors: Michael Berjot, Toulouse (FR); Rémi Lansiaux, Toulouse (FR); Jean-Baptiste Vignes, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/755,108

(22) Filed: Jun. 26, 2024

(65) Prior Publication Data

US 2025/0002164 A1    Jan. 2, 2025

(30) Foreign Application Priority Data

Jun. 28, 2023 (FR) ..................................... 2306784

(51) Int. Cl.
*B64D 27/40*    (2024.01)
(52) U.S. Cl.
CPC .................................. *B64D 27/402* (2024.01)
(58) Field of Classification Search
CPC ...... B64D 27/40; B64D 27/402; B64D 27/404
See application file for complete search history.

(56) References Cited

U.S. PATENT DOCUMENTS

| 5,474,258 A | 12/1995 | Taylor et al. |
| 2009/0108127 A1 | 4/2009 | Cazals |
| 2020/0361618 A1* | 11/2020 | Vayssieres ............... F02C 7/20 |
| 2021/0010424 A1* | 1/2021 | West ....................... F02C 7/20 |
| 2022/0033098 A1 | 2/2022 | Frenot et al. |

(Continued)

FOREIGN PATENT DOCUMENTS

| EP | 1814783 B1 | 5/2008 |
| EP | 3945032 A1 | 2/2022 |
| FR | 3098793 A1 | 1/2021 |

(Continued)

OTHER PUBLICATIONS

French Search Report for corresponding French Patent Application No. 2306784 dated Dec. 7, 2023.

*Primary Examiner* — Nicholas McFall
*Assistant Examiner* — Justin Michael Heston
(74) *Attorney, Agent, or Firm* — Greer, Burns & Crain, Ltd.

(57) ABSTRACT

A front engine attachment system for an engine having an engine pylon with a nose having a main female clevis and a cylindrical housing, a main rod fastened to the engine by a secondary ball joint connection about a secondary axis, a main shaft realizing a main ball joint connection of the main rod in the main female clevis about a main axis, wherein the main axis and the secondary axis are in the same vertical plane, a hollow outer cylinder with a vertical axis, of which a first end is fastened in the cylindrical housing and of which a second end is mounted so as to be able to move, via an annular linear connection, with respect to the front casing and an inner cylinder threaded and fastened in the outer cylinder.

10 Claims, 5 Drawing Sheets

(56) References Cited

U.S. PATENT DOCUMENTS

2023/0002067 A1* 1/2023 Poupon .................. F16C 33/124
2025/0002165 A1* 1/2025 Berjot .................. B64D 27/406

FOREIGN PATENT DOCUMENTS

FR        3103788 A1   6/2021
GB      2119857 A    11/1983
WO     9311041 A1   6/1993

* cited by examiner

FRONT ENGINE ATTACHMENT SYSTEM FOR AN AIRCRAFT ENGINE, WHICH HAS A COMPACT STRUCTURE

CROSS-REFERENCES TO RELATED APPLICATIONS

This application claims the benefit of French Patent Application Number 2306784 filed on Jun. 28, 2023, the entire disclosure of which is incorporated herein by way of reference.

FIELD OF THE INVENTION

The present invention relates to a front engine attachment system for an aircraft engine wherein the front engine attachment system is compact, and to an aircraft having at least one such front engine attachment.

BACKGROUND OF THE INVENTION

An aircraft conventionally has at least one engine, in particular a jet engine. Beneath each wing, and for each engine, the aircraft has an engine pylon that is fastened to the structure of the wing and that extends below the wing, and the engine is suspended beneath the engine pylon.

The engine is housed in a nacelle and fastened to the engine pylon by way of an engine attachment system comprising a front engine attachment and a rear engine attachment.

There are numerous types of front engine attachment that are satisfactory from the point of view of their current use. However, the fans of new engines are increasingly large so as to improve the performance of the engines, and this correspondingly reduces the distance between the nacelle and the ground.

It is then necessary to define a new arrangement making it possible to reduce the height of the front engine attachment so as to move the nacelle away from the ground and consequently to bring the nacelle closer to the wing.

SUMMARY OF THE INVENTION

An object of the present invention is to propose a front engine attachment system that incorporates the engine pylon and the front engine attachment so as to reduce the height of the assembly.

To this end, a front engine attachment system for an engine of an aircraft is proposed, the front engine attachment system having a vertical median plane and having:
- an engine pylon having, at a front part, a nose having a main female clevis and a cylindrical housing around a vertical axis,
- a main rod intended to be fastened to a front casing of the engine by a secondary ball joint connection about a secondary axis perpendicular to the median plane by way of a secondary shaft,
- a main shaft perpendicular to the median plane and realizing a main ball joint connection of the main rod in the main female clevis about a main axis, wherein the main axis and the secondary axis are in one and the same vertical plane perpendicular to the median plane, and
- a hollow outer cylinder coaxial with the vertical axis, of which a first end is fastened in the cylindrical housing and of which a second end is intended to be mounted so as to be able to move, via an annular linear connection, about the vertical axis with respect to the front casing.

Such a front engine attachment system has reduced vertical bulk since the front engine attachment is incorporated in the engine pylon.

Advantageously, the main axis is disposed in front of the vertical axis.

According to one particular embodiment, the front engine attachment system has an inner cylinder inserted and fastened in the outer cylinder.

According to another particular embodiment, the nose has two lateral stops disposed respectively on the port side and on the starboard side of the outer cylinder, which are intended to come between two lateral counter-stops of the front casing.

Advantageously, the front engine attachment system has two lateral rods disposed respectively on the port side and on the starboard side of the main rod, and each lateral rod is mounted on the main shaft with a tight fit and on the secondary shaft with a clearance.

Advantageously, the main shaft is constituted of a peripheral shaft that is hollow and an inner shaft that is housed in the peripheral shaft.

Advantageously, the secondary shaft is constituted of a peripheral shaft that is hollow and an inner shaft that is housed in the peripheral shaft.

The invention also proposes an aircraft having a structure, an engine with a front casing and a front engine attachment system according to one of the preceding variants, wherein the main rod is fastened to the front casing by the secondary ball joint connection and wherein the second end of the outer cylinder is mounted so as to be able to move, via the annular linear connection, about the vertical axis with respect to the front casing.

BRIEF DESCRIPTION OF THE DRAWINGS

The above-mentioned features of the invention, along with others, will become more clearly apparent upon reading the following description of one exemplary embodiment, said description being given with reference to the appended drawings, in which.

DETAILED DESCRIPTION OF THE PREFERRED EMBODIMENTS

Figure 1:
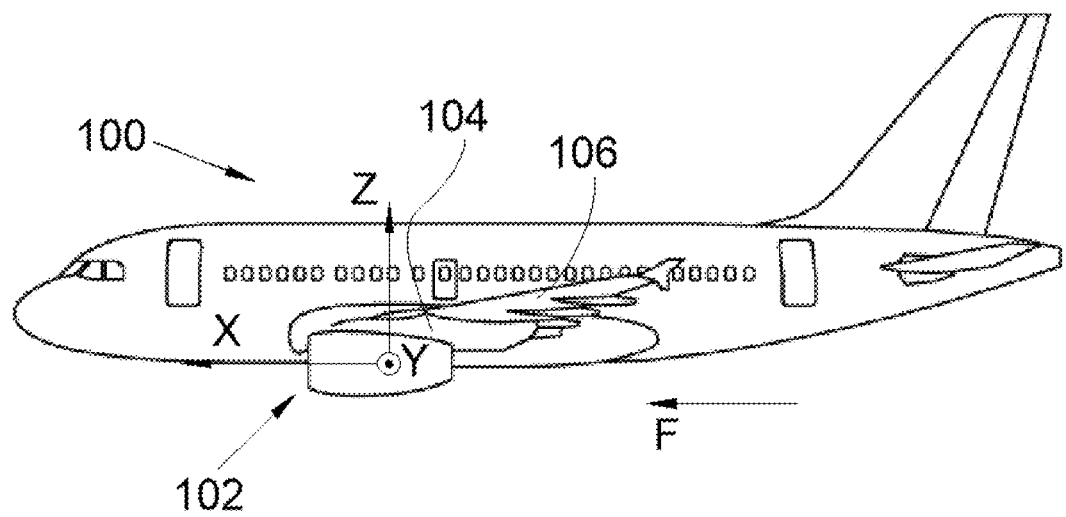
FIG. 1 is a side view of an aircraft according to the invention.

In the following description, terms relating to a position are considered in relation to an aircraft in a position of forward movement, i.e. as shown in FIG. 1, in which the arrow F represents the direction of forward movement.

FIG. 1 shows an aircraft 100 that has an engine 102, in particular a jet engine that is fastened beneath an engine pylon 104 that is itself fastened beneath a wing 106.

In the following description, and by convention, the X direction is the longitudinal direction of the engine 102, with positive orientation in the direction of forward movement of the aircraft 100, the Y direction is the transverse direction of the engine 102, which is horizontal when the aircraft 100 is on the ground, and the Z direction is the vertical direction or vertical height when the aircraft 100 is on the ground, these three directions X, Y and Z being mutually orthogonal.

The engine 102 has a general shape exhibiting symmetry of revolution about the longitudinal axis X.

In the embodiment of the invention that is presented in FIG. 1, the aircraft 100 has an engine 102 beneath each wing 106 of the aircraft 100, but it is possible to provide a plurality of engines beneath each wing 106.

Figure 2:
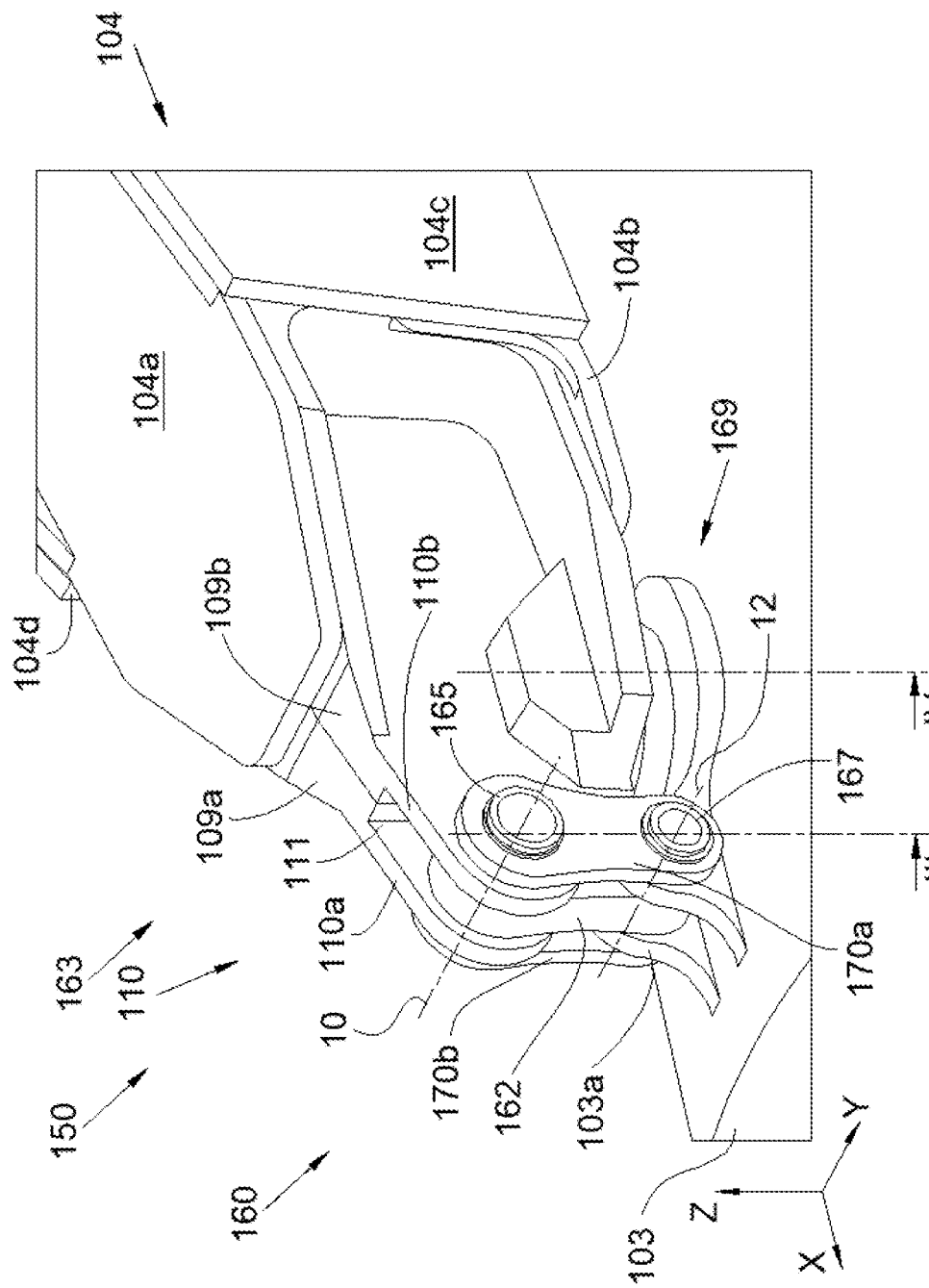
FIG. 2 is a perspective view of a front engine attachment system according to the invention.
Figure 3:
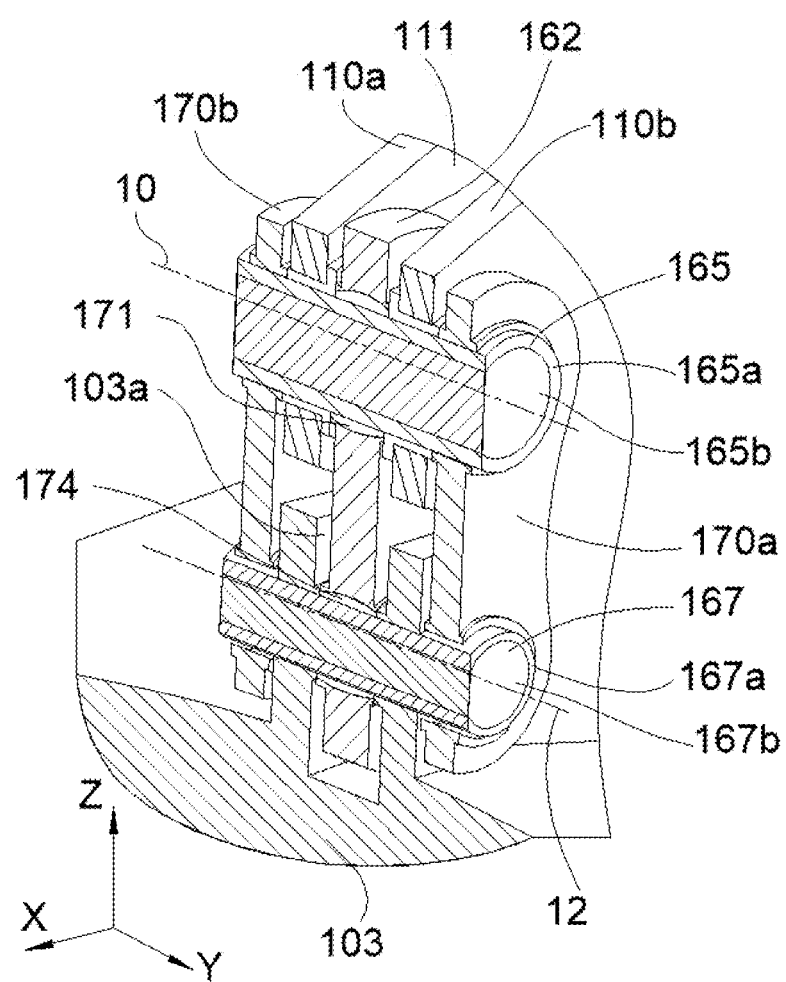
FIG. 3 is a perspective view of a cross section of the front engine attachment system according to the invention on the line III in FIG. 2.
Figure 4:
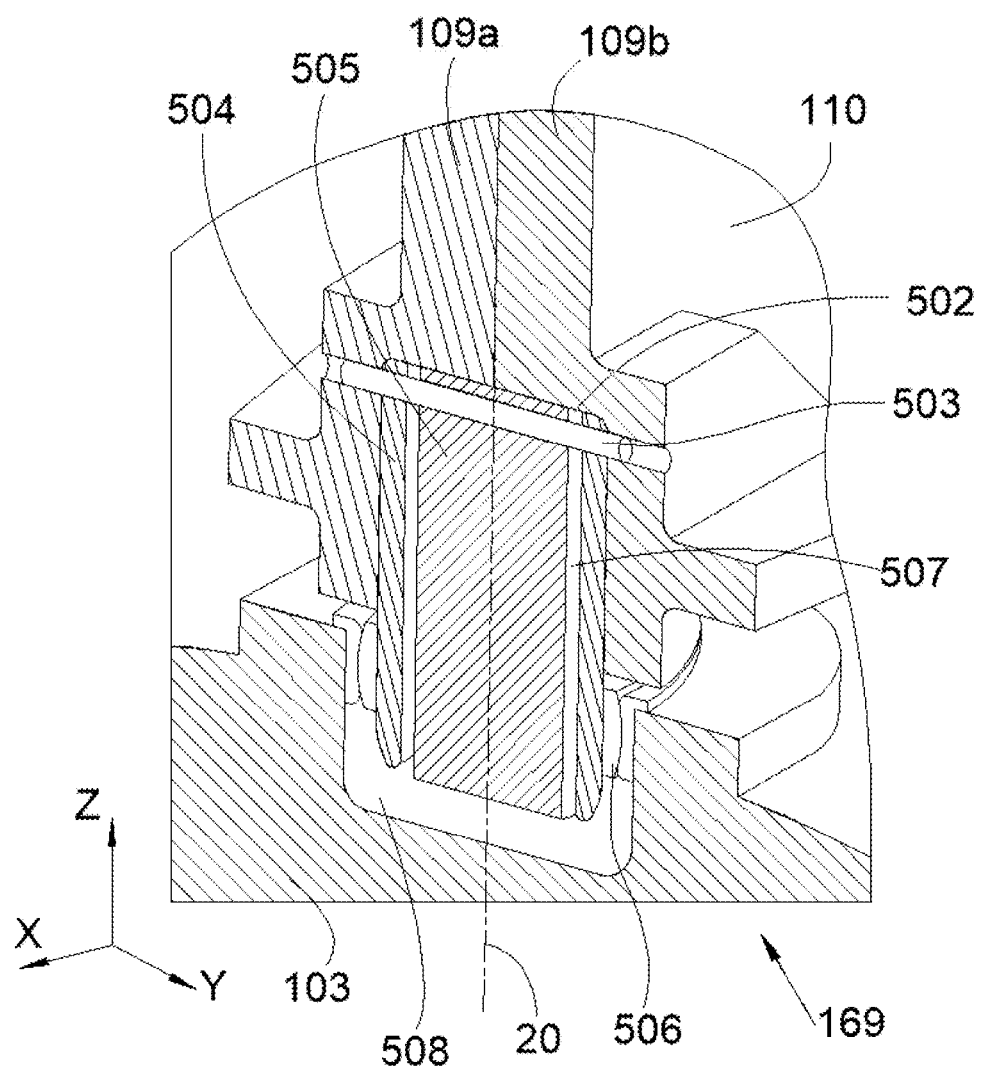
FIG. 4 is a perspective view of a cross section of the front engine attachment system according to the invention on the line IV in FIG. 2.

FIG. 2 shows a front engine attachment system 150 that is fastened to the structure of the aircraft 100, in this case the structure of the wing 106, and extends beneath the wing 106 and supports the engine 102 and in particular the front part of the engine 102. FIGS. 2 to 4 show various views of the front engine attachment system 150.

The front engine attachment system 150 comprises the engine pylon 104, which is fastened to the structure of the wing 106, and a front engine attachment 160, which is fastened between the engine pylon 104 and a front casing 103 as one with the engine 102. The front engine attachment system 150 has a vertical median plane XZ.

Conventionally, a rear engine attachment is fastened between the engine pylon 104 and a rear part of the engine 102 and it can take any form known to those skilled in the art.

The engine pylon 104 takes the form of a box that has, inter alia, at a front part 163, a nose 110 that has a main female clevis 111 constituted of two walls 110a-b that are parallel to one another and vertical, i.e. parallel to the median plane XZ and therefore perpendicular to the transverse direction Y. As specified below, the main female clevis 111 makes it possible to put in place a rod that is mounted so as to be free to rotate in the main female clevis 111 about a main axis 10 oriented transversely, i.e. perpendicularly to the median plane XZ and therefore horizontally so as to realize a ball joint connection referred to as main ball joint connection, of which a main axis of rotation is the main axis 10 and wherein the rotations about the other two axes are of reduced amplitude.

In the embodiment of the invention that is presented in FIGS. 2 to 5, the nose 110 is constituted of two fittings 109a-b fastened to one another at the median plane XZ, and each wall 110a-b constituting the main female clevis 111 belongs to one of the fittings 109a-b, and the two walls 110a-b are in this case symmetrical with respect to the median plane XZ.

FIG. 3 shows a cross section at the main female clevis 111 and a secondary female clevis 103a.

The engine pylon 104 has an upper wall 104a, a lower wall 104b and two lateral walls 104c-d. The various walls 104a-d are as one with one another so as to form a box of which the vertical section is generally trapezoidal. The nose 110 is fastened at the front zone 163 of the engine pylon 104 by any known means, such as for example by welding or bolts. The front zone 163 corresponds to the front ends of the walls 104a-d.

The front engine attachment 160 has a main rod 162 fastened to the nose 110 in the main female clevis 111. The main ball joint connection of the main rod 162 in the main female clevis 111 is realized by a main shaft 165 that is equipped with a boss 171 on which the main rod 162 is mounted in an articulated manner. The main shaft 165 passes through the two walls 110a-b forming the main female clevis 111 and the main rod 162 through bores provided for this purpose. The main shaft 165 is thus perpendicular to the median plane XZ. The main axis 10 constitutes the axis of the main shaft 165.

The main rod 162 is also fastened in an articulated manner to the front casing 103 by a secondary ball joint connection of which a main axis of rotation is a secondary axis 12 that is perpendicular to the median plane XZ and therefore horizontal and wherein the rotations about the other two axes are of reduced amplitude. To this end, the front casing 103 has the secondary female clevis 103a, which is also constituted of two walls that are parallel to one another and vertical, i.e. parallel to the median plane XZ and in this case symmetrical with respect to the median plane XZ. The main rod 162 is fastened to the secondary female clevis 103a by a secondary shaft 167 that passes through the two walls forming the secondary female clevis 103a and the main rod 162 through bores provided for this purpose. The secondary shaft 167 is thus perpendicular to the median plane XZ. The secondary axis 12 constitutes the axis of the secondary shaft 167. The secondary ball joint connection of the main rod 162 with the front casing 103 is realized by the secondary shaft 167 which is equipped with a boss 174 on which the main rod 162 is mounted in an articulated manner.

The secondary axis 12 is vertically aligned with the main axis 10 and beneath the latter, i.e. the axis of the secondary shaft 167 and the axis of the main shaft 165 are in one and the same vertical plane perpendicular to the longitudinal direction X and therefore to the median plane XZ, or in other words, the main axis of the main ball joint connection, i.e. the main axis 10, and the main axis of the secondary ball joint connection, i.e. the secondary axis 12, are in one and the same vertical plane perpendicular to the median plane XZ.

In the embodiment of the invention that is presented in FIG. 3, the main rod 162 is mounted with a tight fit via the bosses 171 and 174 on the main shaft 165 and on the secondary shaft 167. The main shaft 165 is mounted inside the bores of the main female clevis 111 by way of rotating bearings. The secondary shaft 167 is mounted inside the bores of the secondary female clevis 103a with a tight fit.

FIG. 4 shows a cross section at an annular linear connection wherein the translation axis is a vertical axis 20 also called a "spigot connection" 169.

The nose 110 has a cylindrical housing or stud 502 coaxial with the vertical axis 20, which is therefore oriented vertically and in this case in the vertical median plane XZ.

The front engine attachment 160 also has an outer cylinder 504, of which a first end is fastened in the cylindrical housing 502 such that the outer cylinder 504 is coaxial with the vertical axis 20.

The second end of the outer cylinder 504 is mounted so as to be able to move, via an annular linear connection, about the vertical axis 20 with respect to the front casing 103. There is therefore a ball joint connection about a main axis that is the vertical axis 20 between the outer cylinder 504 and the front casing 103, and therefore between the nose 110 and the front casing 103. There is also a sliding connection of which the direction is parallel to the vertical axis 20.

In the embodiment of the invention that is presented in FIG. 4, the ball joint connection is realized by putting in place a boss 506 mounted around the outer cylinder 504, on which boss the front casing 103 is mounted in an articulated manner. The boss 506 is between the outer cylinder 504 and the front casing 103 in which a piercing 508 is realized so as to allow the boss 506 and the second end of the outer cylinder 504 to be put in place.

The sliding connection is realized between the cylindrical stud 502 and the boss 506, which is therefore mounted so as to be free to move in translation along the cylindrical stud 502 parallel to the vertical axis 20.

In the embodiment of the invention that is presented in FIG. 4, the outer cylinder 504 is hollow and the front engine attachment 160 also has an inner cylinder 505 that is inserted and fastened in the outer cylinder 504. The inner cylinder 505 is therefore also coaxial with the vertical axis 20. The outer diameter of the inner cylinder 505 is smaller than the inner diameter of the outer cylinder 504, so as to create a space 507 between them, i.e. between the inside of the outer cylinder 504 and the outside of the inner cylinder 505. The difference in diameter is, for example, of the order of 0.6 mm to 2 mm and preferentially of 1 mm.

In the embodiment of the invention that is presented in FIG. 4, the first end of the outer cylinder 504 and the inner cylinder 505 are fastened by putting in place a pin 503 that is driven into a bore that passes through the outer cylinder 504, the inner cylinder 505 and the nose 110. The axis of the pin 503 is in this case perpendicular to the vertical axis 20.

Figure 5:
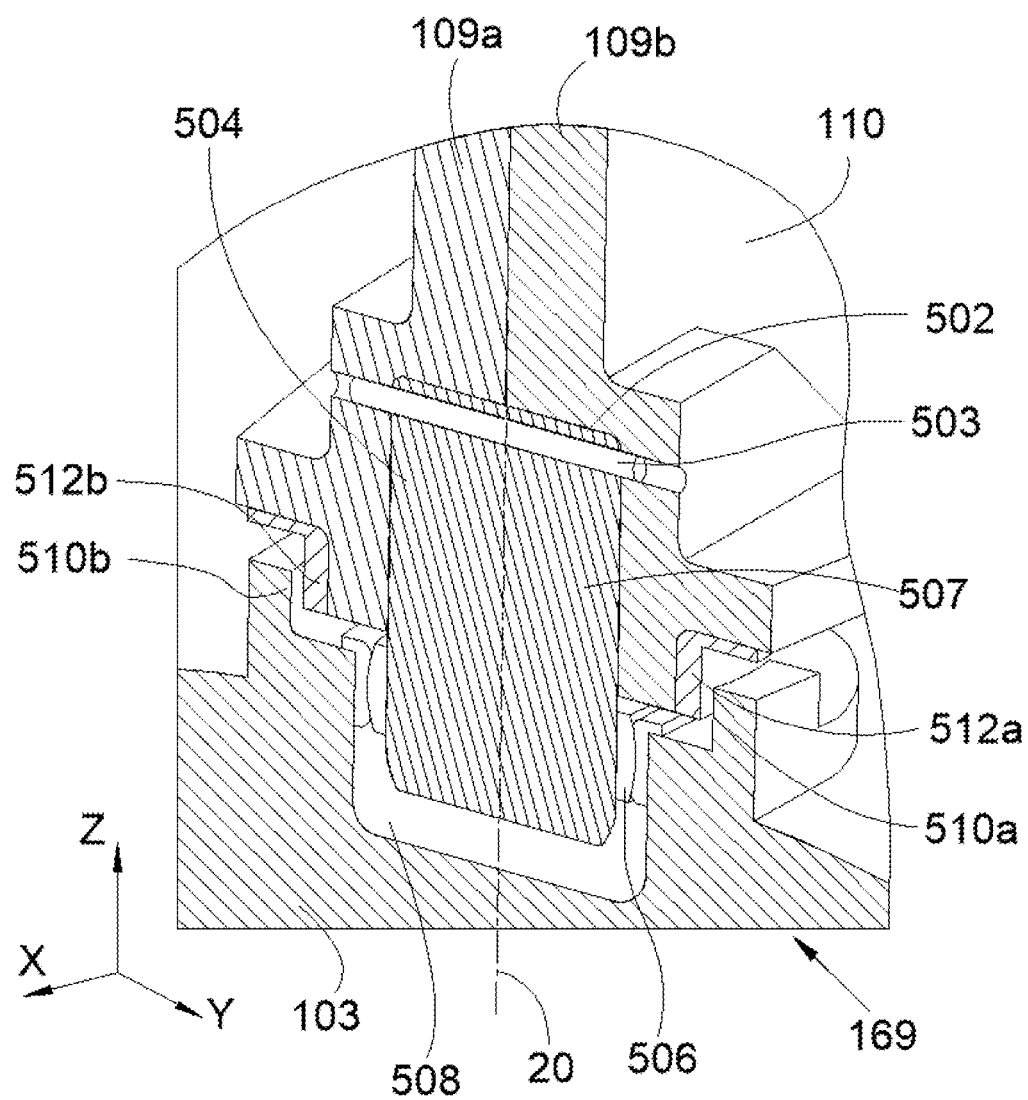
FIG. 5 is a view similar to FIG. 4 for a variant embodiment.

In the embodiment of the invention that is presented in FIG. 5, there is only the outer cylinder 504, which is in this case solid.

The main female clevis 111 is disposed in front of the spigot connection 169 with respect to the longitudinal direction X, i.e. the main axis 10 of the main ball joint connection is in front of the vertical axis 20.

With such an arrangement, the pylon 104 directly incorporates the elements ensuring the fastening of the motor 102 so as to reduce the height necessary for this fastening.

When the engine 102 is in operation, forces are generated and they are transmitted to the structure of the wing through the front casing 103 and the front engine attachment system 150, i.e. through the main rod 162, the secondary shaft 167, the main shaft 165, the spigot connection 169 and the engine pylon 104, which form a primary force path.

The forces in the Z direction are thus transmitted through the secondary ball joint connection and the main ball joint connection, i.e. vertically through the main rod 162.

The forces in the X direction and in the Y direction are transmitted through the spigot connection 169.

For safety reasons, the front engine attachment system 150 also has means that ensure secondary force paths that compensate for failure of the primary force path, these means constituting backup safety means (or "waiting failsafe" means).

In the embodiment of the invention that is presented in FIG. 5, in the event of failure at the spigot connection 169, it is necessary to continue to transmit the forces in the Y direction. Thus, according to a particular embodiment of the invention, the nose 110 then has two lateral stops 512*a-b* that are disposed respectively on the port side and on the starboard side of the outer cylinder 504 and, for each lateral stop 512*a-b*, the front casing 103 has a lateral counter-stop 510*a-b* and the two lateral counter-stops 510*a-b* are also disposed respectively on the port side and on the starboard side of the outer cylinder 504 and the lateral stops 512*a-b* are disposed between the lateral counter-stops 510*a-b*.

In the normal position, i.e. without failure of the primary force path, each lateral stop 512*a-b* is at a distance from the associated lateral counter-stop 510*a-b*, and in the event of failure, one of the lateral stops 512*a-b* comes to bear against the associated lateral counter-stop 510*a-b*.

In the embodiment of the invention that is presented in FIG. 4, in the event of breakage at the outer cylinder 504, the inner cylinder 505 takes over and thus forms a backup safety means (or "waiting fail-safe" means).

In the event of failure, it is necessary to continue to transmit the forces in the Z direction. Thus, according to a particular embodiment of the invention, the front engine attachment system 150 has two lateral rods 170*a-b* disposed respectively on the port side and on the starboard side of the main rod 162, and in the embodiment of the invention that is presented in FIGS. 2 and 3, respectively on the port side and on the starboard side of the walls 110*a-b* forming the main female clevis 111 and symmetrically with respect to the median plane XZ.

Each lateral rod 170*a-b* is mounted on the main shaft 165 with a tight fit and on the secondary shaft 167 with a clearance. Thus, in certain cases of failure, at least one lateral rod 170*a-b* and/or the secondary shaft 167 will move so as to bring the inner wall of the bore of said at least one lateral rod 170*a-b* against the secondary shaft 167.

In the embodiment of the invention that is presented in FIGS. 2 and 3, the main shaft 165 is constituted of a peripheral shaft 165*a* that is cylindrical and hollow and an inner shaft 165*b* that is housed in the peripheral shaft 165*a*. Such an arrangement makes it possible to compensate for any breakage of the peripheral shaft 165*a*.

In the embodiment of the invention that is presented in FIGS. 2 and 3, the secondary shaft 167 is constituted of a peripheral shaft 167*a* that is cylindrical and hollow and an inner shaft 167*b* that is housed in the peripheral shaft 167*a*. Such an arrangement makes it possible to compensate for any breakage of the peripheral shaft 167*a*.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A front engine attachment system for an engine of an aircraft, the front engine attachment system having a vertical median plane and comprising:
    an engine pylon having, at a front part, a nose having a main female clevis and a cylindrical housing around a vertical axis,
    a main rod configured to be fastened to a front casing of the engine by a secondary ball joint connection about a secondary axis perpendicular to the vertical median plane by way of a secondary shaft,
    a main shaft perpendicular to the vertical median plane and comprising a main ball joint connection of the main rod in the main female clevis about a main axis, wherein the main axis and the secondary axis are in one and the same vertical plane perpendicular to the vertical median plane,
    an outer cylinder coaxial with the vertical axis, of which a first end is fastened in the cylindrical housing and of which a second end is configured to be mounted so as to move, via an annular linear connection, about the vertical axis with respect to the front casing, and two lateral rods disposed respectively on a port side and on a starboard side of the main rod, and wherein each lateral rod is mounted on the main shaft with a tight fit and on the secondary shaft with a clearance.

2. The front engine attachment system according to claim 1, wherein the main axis is disposed in front of the vertical axis in relation to a direction of forward movement of the aircraft.

3. The front engine attachment system according to claim 1, further comprising:

an inner cylinder inserted and fastened in the outer cylinder.

4. The front engine attachment system according to claim 1, wherein the nose has two lateral stops disposed respectively on a port side and on a starboard side of the outer cylinder, and which are configured to come between two lateral counter-stops of the front casing.

5. The front engine attachment system according to claim 1, wherein the main shaft comprises a peripheral shaft that is hollow and an inner shaft housed in the peripheral shaft.

6. A front engine attachment system for an engine of an aircraft, the front engine attachment system having a vertical median plane and comprising:

an engine pylon having, at a front part, a nose having a main female clevis and a cylindrical housing around a vertical axis, a main rod configured to be fastened to a front casing of the engine by a secondary ball joint connection about a secondary axis perpendicular to the vertical median plane by way of a secondary shaft, a main shaft perpendicular to the vertical median plane and comprising a main ball joint connection of the main rod in the main female clevis about a main axis, wherein the main axis and the secondary axis are in one and the same vertical plane perpendicular to the vertical median plane, an outer cylinder coaxial with the vertical axis, of which a first end is fastened in the cylindrical housing and of which a second end is configured to be mounted so as to move, via an annular linear connection, about the vertical axis with respect to the front casing, and wherein the secondary shaft comprises a peripheral shaft that is hollow and an inner shaft housed in the peripheral shaft.

7. The front engine attachment system according to claim 6, wherein the main axis is disposed in front of the vertical axis in relation to a direction of forward movement of the aircraft.

8. The front engine attachment system according to claim 6, further comprising:

an inner cylinder inserted and fastened in the outer cylinder.

9. The front engine attachment system according to claim 6, wherein the nose has two lateral stops disposed respectively on a port side and on a starboard side of the outer cylinder, and which are configured to come between two lateral counter-stops of the front casing.

10. The front engine attachment system according to claim 6, wherein the main shaft comprises a peripheral shaft that is hollow and an inner shaft housed in the peripheral shaft.

* * * * *